US012775900B2

(12) United States Patent
Mehta et al.

(10) Patent No.: US 12,775,900 B2
(45) Date of Patent: Oct. 27, 2026

(54) DYNAMIC FLIGHT PATH VARIATION FOR UNMANNED AERIAL VEHICLES

(71) Applicant: ZIPLINE INTERNATIONAL INC., South San Francisco, CA (US)

(72) Inventors: Bijal S. Mehta, San Francisco, CA (US); Sarah Y. Trisorus, San Mateo, CA (US); Tyler P. McNish, Woodside, CA (US)

(73) Assignee: Zipline International Inc., South San Francisco, CA (US)

(*) Notice: Subject to any disclaimer, the term of this patent is extended or adjusted under 35 U.S.C. 154(b) by 0 days.

(21) Appl. No.: 18/018,654

(22) PCT Filed: Jul. 29, 2021

(86) PCT No.: PCT/US2021/043678

§ 371 (c)(1),
(2) Date: Jan. 30, 2023

(87) PCT Pub. No.: WO2022/026690

PCT Pub. Date: Feb. 3, 2022

(65) Prior Publication Data

US 2023/0306355 A1 Sep. 28, 2023

Related U.S. Application Data

(60) Provisional application No. 63/059,692, filed on Jul. 31, 2020.

(51) Int. Cl.
*G06Q 10/083* (2024.01)
*B64U 10/25* (2023.01)
(Continued)

(52) U.S. Cl.
CPC ........... *G06Q 10/083* (2013.01); *B64U 10/25* (2023.01); *G08G 5/34* (2025.01); *G08G 5/55* (2025.01);
(Continued)

(58) Field of Classification Search
CPC ...... G06Q 10/083; G06Q 50/40; G06Q 50/60; G06Q 10/087; G06Q 10/0841;
(Continued)

(56) References Cited

U.S. PATENT DOCUMENTS 9,959,771 B1 * 5/2018 Carlson ................ G08G 5/0069
10,043,149 B1 * 8/2018 Iacono ............... G06Q 30/0637
(Continued)

FOREIGN PATENT DOCUMENTS

WO WO 2020/136832 A1 * 7/2020 ............. B65G 61/00

OTHER PUBLICATIONS

TendersInfo, "United States: Intel at InterDrone 2017," TendersInfo-Euclid Infotech Pvt. Ltd., Sep. 7, 2017.*
(Continued)

*Primary Examiner* — Nathan Erb
(74) *Attorney, Agent, or Firm* — Dorsey & Whitney LLP

(57) ABSTRACT

A flight plan of an unmanned aerial vehicle (UAV) may be updated based on an order update corresponding to an order being delivered by the UAV. A determination may be made that the initial flight plan should be updated to fulfill the order including the order update. The initial flight plan may be updated based on the order update and state information corresponding to the UAV. The updated flight plan may be transmitted to a flight controller of the UAV for execution of the updated flight plan.

20 Claims, 7 Drawing Sheets

(51) Int. Cl.

| | |
|---|---|
| ***G08G 5/34*** | (2025.01) |
| ***G08G 5/55*** | (2025.01) |
| ***G08G 5/57*** | (2025.01) |
| *B64U 101/60* | (2023.01) |

(52) U.S. Cl.
CPC .......... *G08G 5/57* (2025.01); *B64U 2101/60* (2023.01); *B64U 2201/10* (2023.01)

(58) Field of Classification Search
CPC ......... G06Q 10/0843; G06Q 10/08365; G06Q 30/0633; G06Q 30/0635; B64U 10/25; B64U 2201/10; B64U 2101/60; G08G 5/57; G08G 5/55; G08G 5/34
See application file for complete search history.

(56) References Cited

U.S. PATENT DOCUMENTS

| | | | | |
|---|---|---|---|---|
| 10,078,808 | B1 * | 9/2018 | Sibon | G05D 1/0676 |
| 10,131,451 | B2 * | 11/2018 | Salgueiro | B64C 39/024 |
| 10,553,122 | B1 * | 2/2020 | Gilboa-Amir | G08G 5/0039 |
| 2007/0025809 | A1 * | 2/2007 | Lee | B64F 1/06 403/119 |
| 2013/0226731 | A1 * | 8/2013 | MacNeille | G01C 21/3476 705/26.8 |
| 2016/0012393 | A1 * | 1/2016 | Wang | G06Q 10/08355 705/338 |
| 2017/0090484 | A1 | 3/2017 | Obaidi | |
| 2017/0255896 | A1 | 9/2017 | Van Dyke | |
| 2018/0004207 | A1 * | 1/2018 | Michini | G01S 1/024 |
| 2018/0082308 | A1 * | 3/2018 | Gong | B64C 39/024 |
| 2018/0346225 | A1 * | 12/2018 | Winkle | G06Q 50/28 |
| 2019/0043370 | A1 | 2/2019 | Mulhall et al. | |
| 2020/0017237 | A1 * | 1/2020 | Walker | B64D 45/04 |
| 2020/0074526 | A1 * | 3/2020 | Bikumala | G06Q 30/0633 |
| 2020/0266903 | A1 * | 8/2020 | De Rosa | H04B 7/18506 |
| 2022/0076192 | A1 * | 3/2022 | Lee | B65G 1/1373 |

OTHER PUBLICATIONS

International Search Report and Written Opinion Issued in International Patent Application No. PCT/US2021/043678 on Nov. 9, 2021 (6 pages).

* cited by examiner

DYNAMIC FLIGHT PATH VARIATION FOR UNMANNED AERIAL VEHICLES

CROSS REFERENCE TO RELATED APPLICATION

The present application is a 371 of International Patent Application No. PCT/US2021/043678, filed Jul. 29, 2021, which claims priority to U.S. Provisional Application No. 63/059,692 entitled "Dynamic Flight Path Variation for Unmanned Aerial Vehicles," filed on Jul. 31, 2020, each of which is incorporated by reference herein in the entirety and for all purposes.

FIELD OF THE INVENTION

The present invention relates to the use of unmanned aerial vehicles (UAVs), and in particular, the use of UAVs to complete delivery of various products to consumers.

BACKGROUND

Unmanned aerial vehicles (UAVs) may be used to efficiently deliver products to consumers. In some systems, UAVs are provided with a flight plan based on products being delivered to a particular customer, where the products cannot be updated after the products have been loaded onto the UAV and/or after the UAV has begun delivery. Accordingly, consumers may find it difficult to modify, cancel, or reschedule orders, leading to additional trips by UAVs for returns or multiple orders.

SUMMARY

An exemplary method includes receiving an order update corresponding to an order being delivered by an unmanned aerial vehicle (UAV) by execution of an initial flight plan and determining that the initial flight plan should be updated based on the updated order. The initial flight plan is updated based on the order update and state information corresponding to the UAV. The updated flight plan is transmitted to a flight controller of the UAV for execution of the updated flight plan.

In various examples, the exemplary method may further include verifying that the order was fulfilled in accordance with the order update based on receipt of an order verification. The order verification may be received from a delivery module sensing delivery of a payload containing items of the order at a delivery area.

In some examples of the exemplary method, updating the flight plan may comprise changing a delivery area responsive to the order update identifying an updated delivery area.

In some examples of the exemplary method, the order update may comprise adding an item to the order and updating the initial flight plan may comprise locating the item at a distribution center configured to reload and launch the UAV.

In some examples of the exemplary method, determining that the initial flight plan should be updated based on the updated order may comprise evaluating a state of the UAV including a propulsion status and a payload status. In some examples, the payload status may include time-sensitive items included in the order being delivered.

In some examples of the exemplary method, state information of the UAV may comprise one or more of a location of the UAV, a propulsion status of the UAV, and a payload status of the UAV.

In some examples of the exemplary method, updating the initial flight plan may comprise one or more of returning to an origin, updating a delivery area, adding a waypoint, or executing a holding pattern before delivery to an original delivery area.

One or more exemplary non-transitory computer readable media may be encoded with instructions which, when executed by one or more processors of a computing system, cause the computing system to determine, based on an order update for an order being delivered by an unmanned aerial vehicle (UAV), whether to update an initial flight plan of the UAV to effectuate the order update, generate an updated flight plan based on a state of the UAV and the order update, and transmit the updated flight plan to a flight controller of the UAV to execute the updated flight plan.

In various examples, the instructions may further cause the computing system to generate a next flight plan for the UAV responsive to receipt of an order verification that the updated order was delivered to a delivery area.

In various examples, the instructions may cause the computing system to determine whether to update the initial flight plan of the UAV based on one or more of a propulsion status of the UAV and a payload status of the UAV.

In various examples of the exemplary computer readable media, the state of the UAV may comprise one or more of a location of the UAV, a propulsion status of the UAV, and a payload status of the UAV.

In various examples of the exemplary computer readable media, the updated flight plan may include a plan for the UAV to perform one or more actions including returning to an origin, navigating to an updated delivery area, navigating to an added waypoint, and executing a holding pattern before delivery to an original delivery area.

In various examples of the exemplary computer readable media, the order update may include adding an item to the order, and the instructions may further cause the computing system to generate the updated flight plan to include navigation of the UAV to a distribution center having the added item and being configured to reload and launch the UAV.

An exemplary unmanned aerial vehicle (UAV) may include a flight controller configured to communicate with control system of the UAV to execute a flight plan to deliver one or more items of an order from an origin to a delivery area, a communications system configured to communicate with an operating device, and a flight planner configured to update the flight plan for the UAV based on an update to the order received at the communications system during execution of the flight plan.

In various examples of the exemplary UAV, the communications system may be further configured to communicate a verification of delivery to the operating device responsive to delivery of the one or more items of the order to the delivery area.

In various examples of the exemplary UAV, the flight planner may be configured to update the flight plan by changing the delivery area to an updated delivery area responsive to the order update identifying the updated delivery area.

In various examples of the exemplary UAV, the flight planner may be configured to update the flight plan based on state information corresponding to the UAV. In various examples, the state information corresponding to the UAV may comprise one or more of a location of the UAV, a propulsion status of the UAV, and a payload status of the UAV.

Additional embodiments and features are set forth in part in the description that follows, and will become apparent to those skilled in the art upon examination of the specification and may be learned by the practice of the disclosed subject matter. A further understanding of the nature and advantages of the present disclosure may be realized by reference to the remaining portions of the specification and the drawings, which form a part of this disclosure. One of skill in the art will understand that each of the various aspects and features of the disclosure may advantageously be used separately in some instances, or in combination with other aspects and features of the disclosure in other instances.

BRIEF DESCRIPTION OF THE DRAWINGS

The description will be more fully understood with reference to the following figures in which components are not drawn to scale, which are presented as various examples of the present disclosure and should not be construed as a complete recitation of the scope of the disclosure, characterized in that.

DETAILED DESCRIPTION

Figure 1:
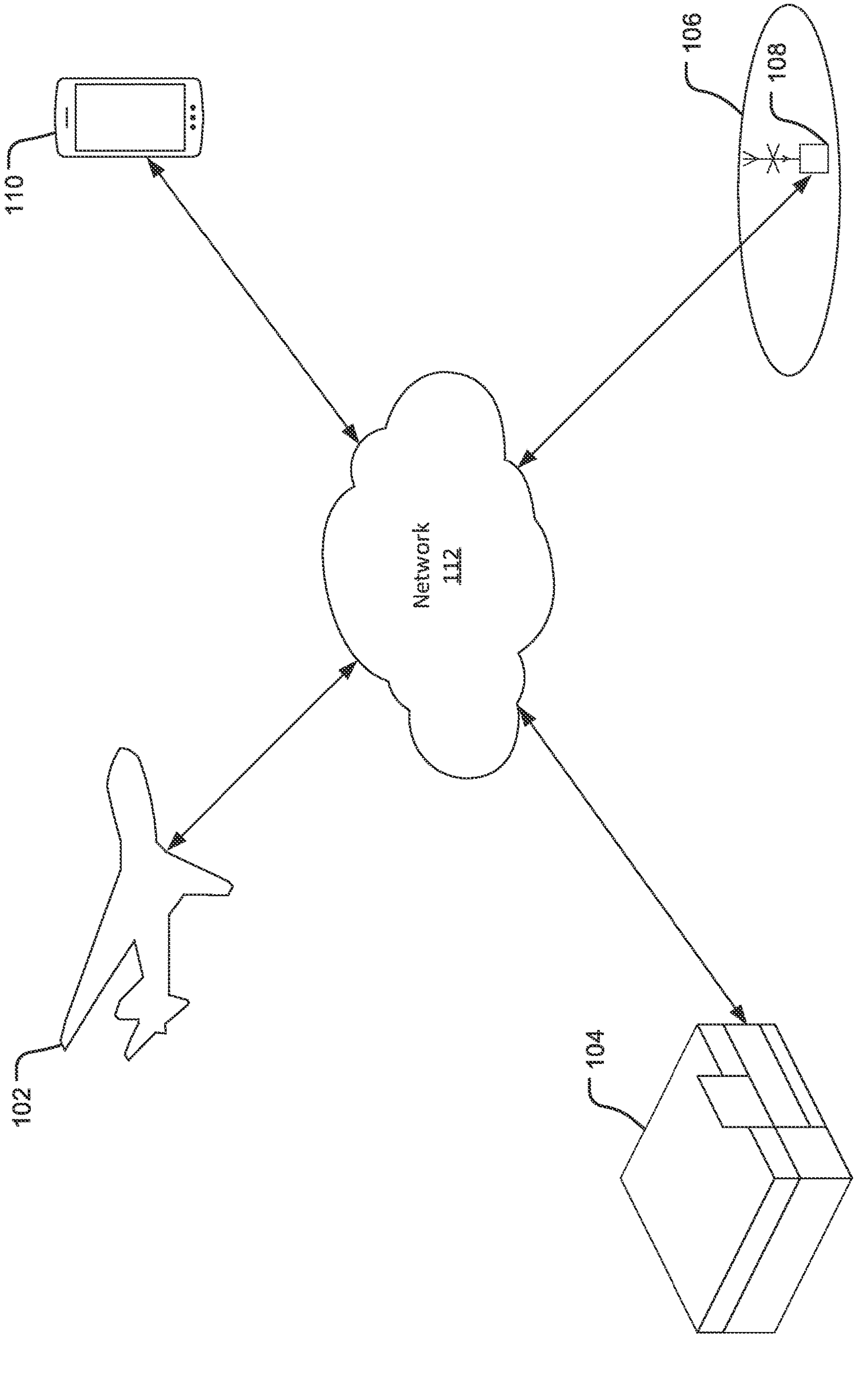
FIG. 1 illustrates an example system including an unmanned aerial vehicle (UAV) in communication with a customer device on a route from an origin to a delivery area.

The use of UAVs to deliver goods may shorten delivery times, reduce human intervention in deliveries, and save costs. Generally, UAVs may be deployed from an origin (e.g., a warehouse or retail location) with a flight plan to fulfill an order by delivering one or more items or products to a delivery area. In some instances, UAVs may include functionality for updating a given flight plan based on weather, air traffic, or other considerations. However, when UAVs do not include functionality for updating a flight plan based on changes to the order being delivered, an order is essentially finalized once the UAV is deployed, which may lead to inefficiencies caused by multiple orders, returned orders, or delivery of an order cancelled shortly after the UAV is deployed.

The systems described herein include a flight planner configured to update a flight plan of a UAV responsive to a change to an order while the UAV is executing the flight plan to deliver the order. In some examples, a change to the order may include the addition and/or deletion of items from the order and the system may determine whether the UAV should return to the origin, stop at a waypoint (e.g., an additional distribution center), and/or continue with the original flight path and deploy a second UAV with additional items. In some examples, a change to the order may be a cancellation of the order and the system may determine whether the UAV should return to an origin, return to a waypoint (e.g., another distribution center or retail location within a distribution network), and/or begin fulfillment of another order including the same item or items. Further, some order changes may comprise changes to delivery time or location and the UAV may determine a flight path to an updated delivery location, whether to add a holding pattern to the flight path based on an updated delivery time, and/or whether to return to the origin.

In some embodiments, a flight planner associated with the UAV may update the original flight plan during delivery of an order and in these instances, customers may communicate with the UAV and enjoy increased flexibility and efficiency in order delivery by UAV. For example, dynamic flight path adjustment may allow for delivery to a location of a customer device rather than to a fixed location. Further, orders may be updated at any point prior to delivery and fulfilled in an efficient manner.

In some embodiments, the UAV itself may be configured to make determinations and updates to the flight plan based on received order information. In other embodiments, the UAV may receive updated flight plan information, such as from a server, cloud based system, and/or other remote computing systems. In these instances, the UAV may communicate with a user device, such as a consumer device, indirectly. In other instances, the UAV may communicate directly with a user device, sensor, and/or additional devices or systems to receive information that may be used to update the flight path.

In some implementations, the UAV and/or systems associated with the UAV may receive verification that an order has been delivered. For example, a customer may use a device to acknowledge delivery or the UAV and/or modules in a delivery area may sense or visually verify delivery of payload of an order. In these embodiments, a new flight plan may be generated and executed upon confirmation of delivery. Additionally, by capturing confirmation information confirming delivery, the system can more accurately trace product information, provide customer service, and/or maintain chain of custody information as needed.

FIG. 1 illustrates an example unmanned aerial vehicle (UAV) 102 in communication with an operating device 110 on a route from an origin 104 to a delivery area 106. The delivery area 106 may include a module 108 or other type of communication device or sensor in communication with the UAV 102 via a network 112. The UAV 102 may be implemented by various autonomous aircraft with payload capacity for delivering commercial items to consumers. For example, in some embodiments, the UAV 102 is a fixed-wing aircraft with redundant propulsion systems optimized for long range flight. In some embodiments, the UAV 102 is implemented using a quad rotor aircraft. In some embodiments, the UAV 102 may be implemented by a hybrid fixed-wing aircraft, a fixed-wing aircraft including horizontal and vertical motors, a blimp, balloon, glider, helicopter, or other aircraft. As described with respect to FIG. 2, the UAV 102 may include various hardware and software components to dynamically adjust and execute flight plans for the UAV 102. Various hardware and software components of the UAV may further communicate with sensors, remote computing systems, and the like to receive flight plans and/or information used to update and/or execute flight plans for the UAV 102.

The UAV 102 may communicate with the origin 104, the delivery area 106 (and/or the delivery module 108), the operating device 110, and other devices via the network 112. In various embodiments, the network 112 may be implemented by various radiofrequency bands such as very high frequency (VHF) bands, satellite communications, or cellular communications. Various portions of the network 112 may be implemented using the Internet (e.g., WiFi), a local area network (LAN), a wide area network (LAN), and/or other networks. In addition to traditional data networking protocols, in some embodiments, data may be communicated according to protocols and/or standards including near field communication (NFC), Bluetooth, cellular connections, and the like. Further, the UAV 102 may communicate with devices using different networks. For example, the UAV 102 may communicate with the operating device 110 via a cellular data network and may communicate with the delivery module 108 using Bluetooth. Accordingly, the network 112 may be implemented by various combinations of networking and/or communications protocols.

The UAV 102 may travel from an origin 104 to a delivery area 106 to deliver a payload (e.g., an order) to a location within or near the delivery area 106. The origin 104 may be, for example, a warehouse, distribution center, retail location, or other fixed or mobile facility that facilitates the launch of the UAV 102 and/or where the UAV 102 may receive payload (e.g., items for an order). In some implementations, multiple distribution centers may form a distribution network, where a UAV 102 may launch from, land at, and/or fly between any of the distribution centers in the network. For example, a distribution network may include a regional distribution center for a retailer and various retail locations served by the distribution center. A distribution network may also, in various implementations, include a centralized distribution center and one or more satellite distribution centers, which may be geographically placed to improve delivery efficiency. For example, a satellite distribution center may store products more commonly ordered for delivery to geographic areas close to the satellite distribution center. In various implementations, a distribution network may include multiple distribution centers of the same size. The origin 104 and other distribution centers may include specialized infrastructure, such as launch and landing platforms, loading infrastructure, and the like for the UAV 102.

The delivery area 106 may be, for example, an address (e.g., street address, building, etc.), a designated delivery area (e.g., a designated drop location outside of an apartment building, hospital, or shared retail space), and/or an area defined by a location of the operator device 110. In some implementations, a designated delivery area 106 may include one or more delivery modules 108, which may provide various types on information about the delivery area 106 to the UAV 102. Delivery modules 108 may include, for example, proximity sensors that transmit a signal to the UAV 102 when an object (e.g., a package, person, or other UAV) is located in the delivery area 106. In various implementations, delivery modules 108 may also include cameras, user interfaces, radiofrequency identification (RFID) sensors, and/or signal transmitters for wireless radio, Internet, Bluetooth, or other NFC signals. Upon receipt of an the signal indicating that the delivery area 106 is obstructed or otherwise unavailable, the UAV 102 may update the flight plan accordingly, e.g., update to a new delivery area, change the delivery type (e.g., landing to air drop), cancel and reset a new delivery time, etc.

In some implementations, the delivery area 106 may be sufficient area for the UAV 102 to land and re-launch. The delivery area 106 may include structures for re-launch of the UAV 102. In some implementations, the UAV 102 may drop items in the delivery area 106 to complete delivery without landing. For example, some items may be packaged with parachutes, wings, or other structures to slow landing such that the UAV 102 may complete delivery of the items without landing in the delivery area 106. The UAV 102 may, in some embodiments, include a secondary vehicle to complete delivery, such that the secondary vehicle drops payload within the delivery area 106. The type of delivery (e.g., landing or payload drop) may depend on the type of payload, packaging of the payload, and the like. For example, very heavy or fragile payload may be delivered by landing the UAV 102 where dropping the payload may cause damage to the payload, damage to the landing area 106, and/or a safety hazard.

An operator device 110 may communicate with the UAV 102 while the UAV 102 executes a flight plan to fulfill an order placed by the operator device 110 (or another computing device associated with the operator device 110). The operator device 110 may be, for example, a computing device. In some embodiments, the operator device 110 is a smart phone or tablet that allows a user to track and/or update an order being delivered by the UAV 102 via a display and input devices of the operator device 110. Accordingly, a consumer or other user of the operator device 110 may be able to initiate dynamic changes to the flight path of the UAV 102 while the UAV 102 is traveling between the origin 104 and the delivery area 106.

Figure 2:
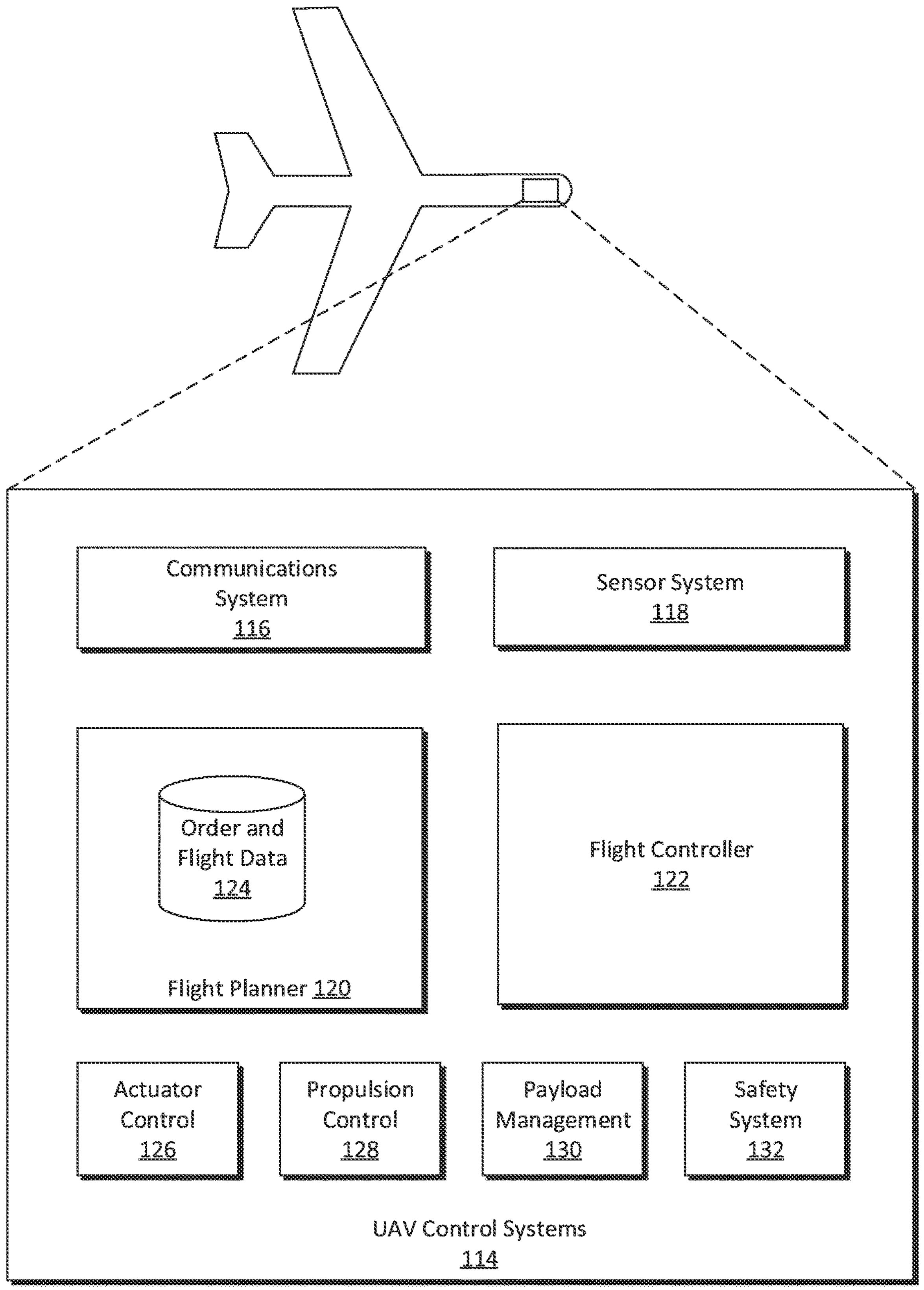
FIG. 2 is a schematic diagram of an example UAV in accordance with particular embodiments.

FIG. 2 is a schematic diagram of an example UAV 102 in accordance with particular embodiments. The UAV 102 comprises UAV control systems 114, which may include a communications system 116 and a sensor system 118. A flight planner 120 may receive information from the communications system 116 and the sensor system 118 and use the information to create and/or update a flight path for the UAV 102 using order and flight data 124. The flight planner 120 may communicate the updated flight plan to a flight controller 122, which may communicate with actuator control 126, propulsion control 128, payload management 130, and/or a safety system 132 to execute the flight plan for the UAV 102.

The UAV control systems 114 may be implemented be various hardware modules and/or devices. In some implementations, various components of the UAV control systems 114 may be combined into a single component. Various components of the UAV control systems 114 may, in some embodiments, be provided as separate hardware components. The UAV control systems 114 may be implemented by any number of various types of hardware components including system on chip (SOC) hardware, various processors, controllers, programmable logic, and the like. Various hardware modules may be interconnected by a communications bus, which may be implemented using a Controller Area Network (CAN) standard. In some implementations, some modules of the UAV control systems 114, such as the flight planner 120, may be implemented using computing resources not located within the UAV 102. For example, the flight planner 120 may be implemented using a remote computing system and the UAV control systems 114 may include hardware for communicating with the remote computing system.

The communications system 116 may comprise transmitters and receivers that enable the UAV 102 to send and receive information using various communications protocols. For example, the communications system 116 may include transmitters and receivers for code division multiple access (CDMA), global system for mobile communications (GSM), various cellular standards (e.g., 3G/4G/5G), long-term evolution (LTE), WiFi, Bluetooth, and/or custom line of sight and mesh protocols that may allow the UAV 102 to communicate with other UAVs. The flight planner 120, flight controller 122 and/or other components of the UAV 102 may access information received by the communications system 116 and may access components of the communications system 116 to send information to other systems and/or devices in communication with the UAV 102. For example, the flight planner 120 may access a cellular transmitter of the communications system 116 to communicate an updated flight plan for the UAV 102 to the user device 110.

The sensor system 118 may include various sensors configured to gather different types of information about the environment of the UAV 102. For example, the sensor system 118 may include a global positioning system (GPS), inertial measurement unit (IMU), dynamic pressure sensors, static pressure sensors, air temperature sensors, proximity sensor, cameras, audio sensors and/or other sensors. Data collected by the sensors of the sensor system 118 may be used by various components of the UAV control systems 114. In some embodiments, UAV control systems 114 may include additional hardware components and/or software modules configured to process raw data received by sensors of the sensor system 118 and provide processed data to various components of the UAV control systems 114. In some embodiments, components of the control system 114 may be configured to process raw data used by the respective components.

Control systems 114 of the UAV 102 may include, for example, actuator control 126, propulsion control 128, payload management 130, and a safety system 132. Such systems may control various mechanical components of the UAV 102 to execute flight plans for the UAV 102 and/or monitor various components of the UAV 102. The actuator control system 126 may include or provide control signals to actuators that control various moving parts of the UAV 102, such as rudders, elevators, and other control structures of the UAV 102. The actuator control system 126 may change the state of actuators on the UAV 102 and may report the current state of any actuators to other components of the UAV control systems 114.

Propulsion control 128 may control force exerted by any engines included in the UAV 102 (e.g., by adjusting the speed of propellers mounted on a propeller powered UAV). Propulsion control 128 may also monitor an amount of fuel or battery power remaining on the UAV 102. Payload management 130 generally performs functions related to the payload (e.g., items of a customer order) transported by the UAV 102. Payload management 130 may monitor the state (e.g., orientation, temperature) of the payload and controls release of payload.

The flight controller 122 may store the flight plan and provide instructions to control systems of the UAV 102 execute the flight plan. The flight controller 122 may receive data from the communications system 116 and the sensor system 118 to continuously compute the location, speed, and heading of the UAV 102. The flight controller 122 may combine location information with the flight plan and determine what, if any, changes or adjustments may be made to keep the UAV 102 on a path specified in the flight plan. For example, the flight controller 122 may compute waypoints for the UAV 102 to fly from an origin to a destination and compute orientation and propulsion to move the UAV 102 to a next waypoint. The flight controller 122 may then send commands to other modules of the UAV control systems 114, such as the actuator control 126 and the propulsion control 128 to take action to adjust the orientation and speed of the UAV 102.

The flight controller 122 may continuously calculate an estimated position, orientation, and speed of the UAV 102 using state estimation based on information received from other components of the UAV control systems 114. For example, the flight controller 122 may perform state estimation using engine state information from the propulsion control 128, actuator state information from actuator control 126, and information from various sensors of the sensor system 118. The flight controller 122 may then determine appropriate adjustments for propulsion and actuation for the UAV 102 to continue moving along a path defined in the flight plan.

The flight planner 120 may use order and flight data 124 to generate and update flight plans to fulfill orders using the UAV 102. The flight planner 120 and/or portions of the flight planner 120 may be implemented by computing systems remote from and in communication with the UAV control systems 114. The flight planner 120 and/or portions of the flight planner 120 may be implemented at the UAV 102 as part of the UAV control systems 114. For example, in one implementation, the flight planner 120 is implemented by cloud computing resources in communication with the UAV control systems 114 via the network 112. In some implementations, the flight planner 120 may be implemented by computing systems located at distribution location (e.g., the origin 104) within the distribution network or at a centralized control location. In either implementation, the flight planner 120 is in continuous communication with the UAV 102. Similarly, the order and flight data 124 may be located at the UAV 102, at a storage location apart from the UAV 102 (e.g., cloud storage or a flight control database) or at a combination of locations.

Generally, the flight planner 120 may receive order updates and determine, based on order updates, whether the flight plan of the UAV 102 should be updated and how the flight plan should be updated. To make the decision, the flight planner 120 may access order and flight data 124 which may include, for example, an estimated time from origin 104, estimated time to destination 106, locations of any other distribution centers within the distribution network, the stock (e.g., item availability) of various distribution centers within the distribution network, other orders waiting to be fulfilled in the distribution area, skymaps or other maps of the distribution area, weather data, air traffic data, and/or other relevant information.

The flight planner 120 may further access information about the UAV 102 when making determinations about flight path updates. For example, the flight planner 120 may access location information (e.g., the location of the UAV 102 within a skymap or relative to the origin 104, other distribution locations, or a delivery area 106), propulsion information (e.g., the amount of power left before the UAV 102 returns to a distribution location or hub for charging or the amount of fuel left before the UAV 102 is refueled), payload status (e.g., temperature of payload for temperature sensitive items) or other information about the state of the UAV 102 to determine what updates to make to a flight plan. The flight planner 120 may access and/or utilize various machine learning (ML), artificial intelligence (AI), and other algorithms to determine an updated flight path for the UAV 102.

Figure 3:
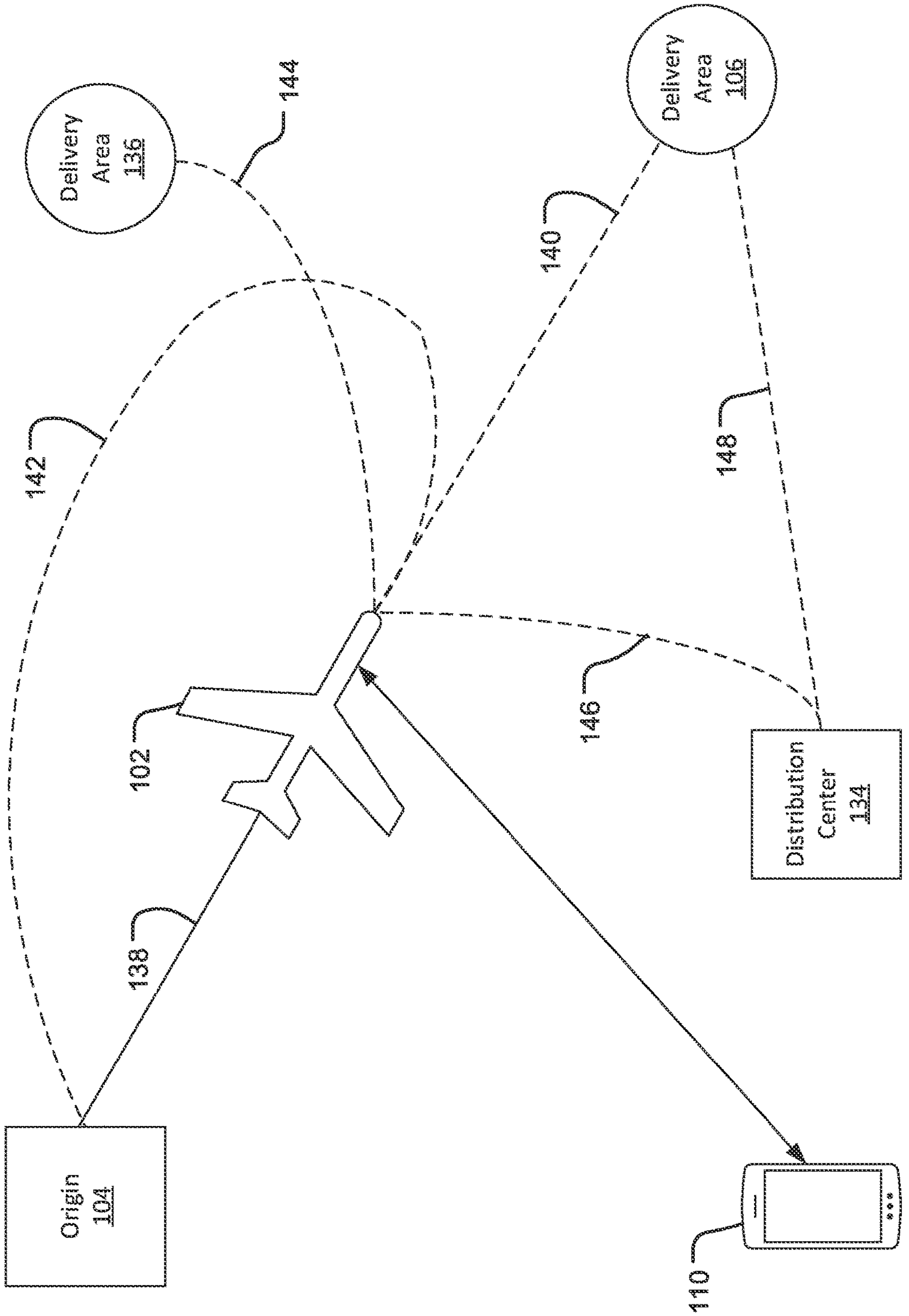
FIG. 3 illustrates example flightpaths and example updates to flightpaths of a UAV from an origin to a delivery area.

FIG. 3 illustrates example flightpaths and example updates to flightpaths of a UAV 102 from an origin 104 to a delivery area. The UAV 102 of FIG. 3 is shown during execution of an initial flight path, having traveled a portion 138 of the initial flight path from the origin 104. In the situation shown in FIG. 3, the UAV 102 may receive an order update from an operating device 110 after traveling the portion 138 of the initial flight path. Though the UAV 102 is shown in direct communication with the operating device 110, in some implementations the order update may be transmitted to an intermediate location (e.g., a cell tower, server, or UAV messaging service) before being received by the communications system 116 of the UAV 102. In other implementations, the UAV 102 may receive an updated flight plan from the flight planner 120 at the communications system 116. For example, the flight planner 120 may be located at a distribution center or other location apart from the UAV 102 and the operating device 110 may communicate with the flight planner 120 at its location.

In some implementations, an order update may be received from a device besides the operating device 110. For example, a delivery module 108 may communicate with the UAV 102 to update a delivery location. Further, an order cancellation or other update may be received from a distribution center, retailer, or other control location for the UAV 102.

An order update may change one or more aspects of the order being fulfilled by the UAV 102 including, for example, items being delivered, timing of delivery, and/or delivery area. For example, an order update may add additional items to an order or remove one or more items in the order. Other order updates may cancel or delay an order or change a delivery area for the order (e.g., by requesting delivery to a new address and/or location).

Responsive to receipt of the order update, the flight planner 120 may request data regarding the state of the UAV 102 from the flight controller 122, the sensor system 118, the actuator control 126, propulsion control 128, payload management 130, and/or other systems (either incorporated into the UAV 102 or separate from the UAV 102) having data regarding the flight path of the UAV 102. The flight planner 120 may also request the current flight plan being executed by the flight controller 122. The flight planner 120 may also access flight and order data 124 to decide how or whether to update the flight plan responsive to the order update, as discussed in more detail with respect to FIG. 4.

The flight planner 120 may update or maintain the flight plan in several ways, some examples of which are depicted in FIG. 3. In some implementations, the flight planner 120 may instruct the UAV 102 to continue along a path 140 to the original delivery area 106, despite the order update. For example, an order update may request that an item be added to an order where the UAV 102 does not have payload capacity for the additional item or where an item in the initial order is time-sensitive (e.g., needed by a particular time, temperature controlled, etc.). Based on this, the flight planner 120 may determine that the original flight plan should not be altered and an additional UAV should deliver the additional item to the delivery area 106.

The flight planner may also update the flight plan to instruct the UAV 102 to return to the origin 104 along a path 142. The UAV 102 may return to the origin 104 to retrieve additional items, remove or substitute items from its payload, and/or upon cancellation of the order. Upon a request to update the delivery area from a delivery area 106 to a delivery area 136, the flight planner 120 may update the flight plan to follow a path 144 to the delivery area 136. The flight planner 120 may also add a waypoint, such as a distribution center 134 to the flight plan via the path 146 to the distribution center 134 and the path 148 from the distribution center 134 to the delivery area 106 to, for example, retrieve additional items added to the order in the order update. Other flight plan updates, such as holding patterns or temporary groundings are also contemplated.

Once the updated flight plan is generated, the flight planner 120 communicates the updated flight plan to the flight controller 122 for execution. In implementations where the flight planner 120 is separate from the UAV 102, the updated flight plan may be first received by the communications system 116 of the UAV 102 and then transmitted to the flight controller 122. In some implementations, the flight planner 120 may also transmit the updated flight plan to other devices and locations such as the operation device 110, a distribution center (e.g., the origin 104 or another distribution center 134 in the distribution network), and/or a centralized control center.

Figure 4:
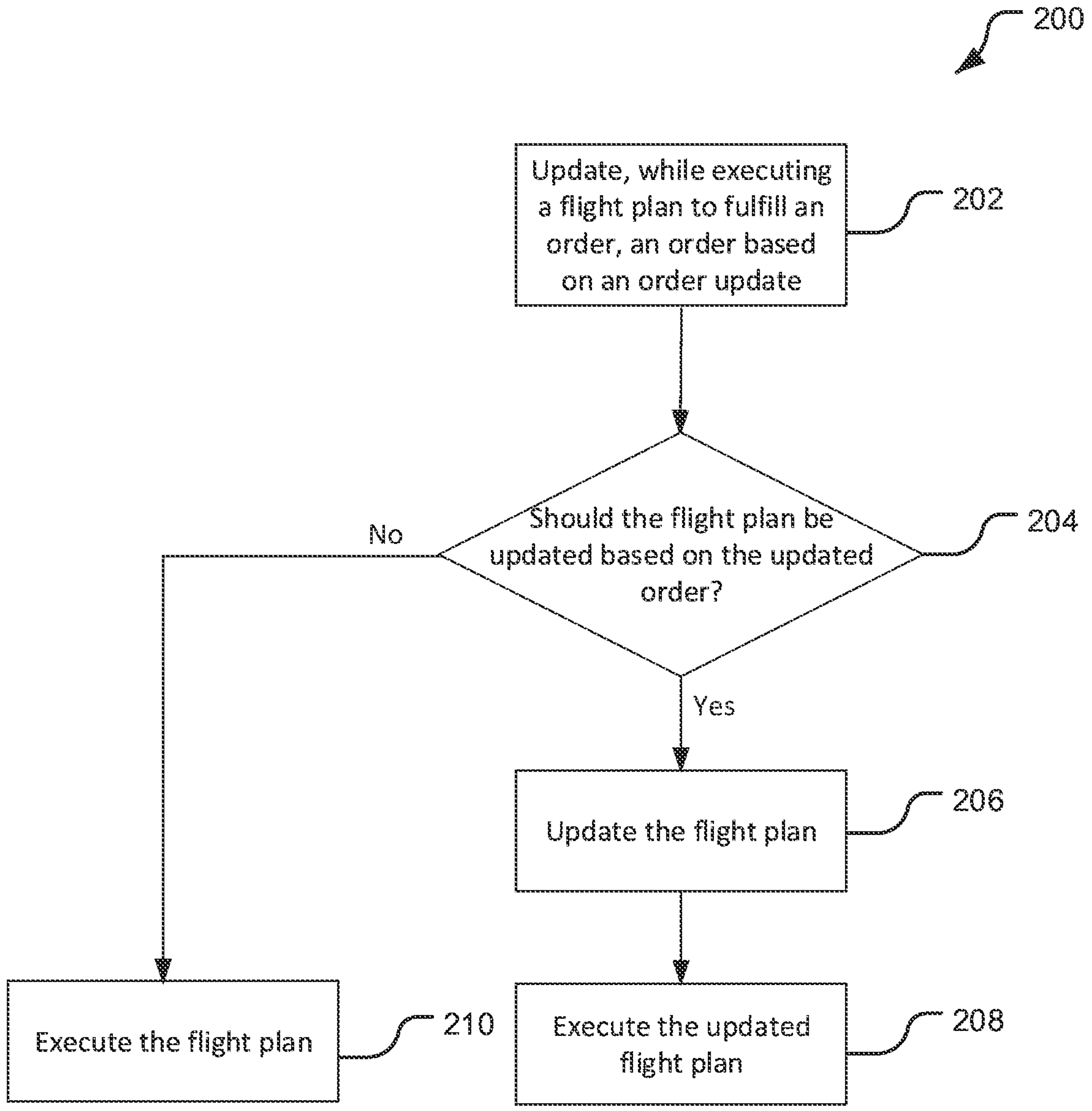
FIG. 4 is a flow diagram of example operations for updating a flight plan of a UAV responsive to communications to the UAV while executing the flight plan.

FIG. 4 is a flow diagram of a method 200 for updating a flight plan of a UAV (e.g., the UAV 102) responsive to communications to the UAV 102 while executing the flight plan. The operations of the method 200 may be performed by various components of the UAV 102 and/or computing systems in communication with the UAV 102. For example, the flight planner 120 and/or the flight controller 122 may perform or carry out various operations of the method 200. An updating operation 202 updates an order based on an order update received while executing a flight plan. As discussed above with respect to FIGS. 1-3, an order update may update the timing of an order, the contents of an order, and/or the delivery area for an order. The order may, in some instances, be updated by the customer who placed the order via an operating device 110. For example, an operating device 110 may execute an application or other software that confirms the order and tracks delivery. The application may include options for a user to modify various elements of the order, such as delivery time, items being delivered, and/or delivery location. For example, in some implementations, the delivery location may be updated by user input (e.g., dropping a pin at a new delivery location on a map displayed by the operating device 110, selecting a location on a map, or providing an address or coordinates). In other implementations, the delivery area may be determined by the location of the operating device 110 and, accordingly, the delivery area may be updated upon significant movement of the operating device 110. For example, the GPS coordinates of the operating device 110 may be used to determine a location of the operating device 110.

The order may be updated by communication with a delivery module 108 or flight control center for the UAV 102. For example, a delivery module 108 may indicate that the initial delivery area 106 is obstructed such that the order cannot safely be delivered to the delivery area 106, and the flight planner 120 may be prompted to either select an alternate delivery area or update the flight plan to delay delivery until the delivery area 106 is clear. The flight planner 120 may use, for example, data from payload management 130 (e.g., current temperature of temperature sensitive items), propulsion control 128 (e.g., the amount of power and/or fuel available at the UAV 102), and/or additional information to determine how to update a flight plan when the delivery area 106 is obstructed. The delivery beacon 108 may detect an obstruction using light sensors, laser lines, weight sensors, cameras, or other types of sensors. The updating operation 202 may communicate any changes to the order to the flight planner 120, which may compare the new order to the original order to determine what actions should be taken to fulfill the updated order. For example, the flight planner 120 may determine that 10 minutes should be added to the flight plan to delay the order upon request from the operating device 110, or that the original order should not be delivered upon a cancellation request.

A decision 204 determines whether the flight plan should be updated based on the updated order. For some order updates, e.g., an order cancellation or change to the delivery area, the flight planner 120 may determine that the flight plan should be updated based on the type of order update. For example, an order cancellation may cause an update to the flight plan to prevent delivery of the items to the delivery area.

For other types of updates, the flight planner 120 may obtain additional information about the update and the UAV 102 to determine whether to update the flight plan. For example, an order update may request the addition of an item to an order. To determine whether to update the flight plan based on the addition, the flight planner 120 may access information about the current payload from the payload management 130. The flight planner 120 may be programmed to continue on the original flight path (e.g., to not update the flight plan) where the payload management 130 indicates that the current payload is time sensitive (e.g., an emergency delivery or payload that must remain at a cold temperature) or that the UAV 102 is at maximum weight or volume capacity for payload. In other situations, the flight planner 120 may use information from the payload management 130 in combination with order and flight data 124 and/or propulsion control 128 data to determine whether to update the flight plan. For example, the flight planner 120 may access order and flight data 124 to determine an approximate size and weight of an item added to the order. In combination with data from the payload management 130, the flight planner may determine whether the additional item will exceed a weight or volume capacity of the UAV 102.

In addition to payload capacity, the flight planner 120 may consider flight distance and UAV 102 power when determining whether a flight plan should be updated based on the addition of an item to an order. Data from propulsion control 128 may also indicate a propulsion status of the UAV 102, which may be, for example, an amount of fuel or electrical power remaining in the UAV 102. The flight planner 120 may use such data from the propulsion control 128 and order and flight data 124 indicating where the additional item is located to determine whether to update the flight plan. For example, an additional item may be located at a distribution center 10 miles away from the current location of the UAV 102, where the UAV 102 is 2 miles from the deliver area 106 and 2 miles from another distribution center where the UAV 102 may be refueled or charged. The propulsion control 128 may show that the UAV 102 has sufficient power to travel approximately 6 miles. Accordingly, the flight planner 120 may determine that the flight plan should not be updated and, instead, an additional UAV should deliver the additional item to the delivery area 106.

Where the flight plan is not updated based on the updated order, an executing operation 210 executes the flight plan. In some implementations, where the flight planner 120 is remote from the UAV 102, the executing operation 210 may comprise the flight controller 122 continuing its operations without any notification from the flight planner 120. In some implementations, the flight planner 120 may communicate with the flight controller 122 to instruct the flight controller 122 to continue with execution of the original flight plan by communicating with other components (e.g., actuator control 126, propulsion control 128, and payload management 130) of the UAV 102. The flight planner 120 may also transmit a notification to the operating device 110 indicating that the original flight plan is not being updated and detailing how the order update will be executed (e.g., that another UAV will be deployed with the additional item and is expected to arrive at an estimated time).

Where the flight plan is updated based on the updated order, an updating operation 206 updates the flight plan. During the updating operation 206, the flight planner 120 may use data gathered about the UAV 102 in decision 204 to update the flight plan. For example, the flight planner 120 may use state information provided by the flight controller 122 to begin updating the flight plan. For example, the flight planner 120 may use an estimated location and heading of the UAV 102 to locate the UAV 102 on a skymap as a starting point in updating the flight plan.

The flight planner 120 may identify limiting factors on the update of the flight plan and take the limiting factors into account when determining how to update the flight plan. For example, propulsion control 128 may provide the flight planner 120 with an estimated flight range of the UAV 102 without refueling or recharging. The flight planner 120 may then limit changes to the flight plan to travel within the range. Other limiting factors may include payload status, which may be provided to the flight planner 120 by payload management 130. Payload status may be limiting where time-sensitive payload is being delivered. For example, some cold temperature payload may have a limited delivery window. Similarly, emergency or urgent deliveries may include time limitations. The flight planner 120 may then limit changes to changes that result in delivery or restock of the time-sensitive payload within the given time window. Other limiting factors may be determined based on additional data such as weather or air traffic data.

In some examples, the flight planner 120 may weight limiting factors or characteristics such that some factors have priority over others. For example, the flight planner give priority to factors making a flight path and/or delivery physically unfeasible, dangerous, and the like. Such factors may include, for example, weather, air traffic restrictions, fuel and/or power levels, etc. For example, fuel and/or power may be given a high priority (e.g., weighted) by the flight planner 120 to limit flight plans to those within range given the amount of fuel and/or power remaining at the UAV 102. Weather conditions (e.g., weather making flight paths dangerous or unavailable) may be given similar high priority. In some embodiments, some weather conditions may be predetermined or preset for high priority treatment. For example, predicted or actual wind speeds above a certain threshold, storm warnings, and the like may be given high priority while other weather conditions, such as wind speeds below the threshold, storm watches or predictions, precipitation, and other similar conditions may be given different or lower priority.

The flight planner 120 may identify options to fulfill the order update by choosing a new destination or route for the flight plan. In some situations, the options may be limited to, for example, changing the delivery area as requested and identifying a path to the new delivery area. For other updates, the flight planner 120 may identify several possible options and choose an efficient option from among the possible options. Further, the flight planner 120 may identify backup options where the new destination and/or routes are not feasible given applicable high priority factors. For example, where an order is updated to change the delivery location, the flight planner 120 may update the destination to the new delivery location. If, for example, the UAV 102 does not have enough fuel and/or power to reach the updated destination, the flight planner 120 may instead update an initial destination to a recharging and/or refueling location for the UAV 102. From the recharging or refueling location, the flight planner 120 may generate a new flight plan to navigate to the updated delivery location or the order may be fulfilled by another UAV.

In another example, where an order is updated to cancel one of several items, the flight planner 120 may update the flight plan to return to a distribution center, remove the cancelled item, and re-launch the UAV 102 to deliver the remainder of the order. The flight planner 120 may identify distribution centers within range of the UAV 102 and pick one that will result in the fastest delivery of the remainder of the order based on, for example, landing capacity, launch capacity, and distance. Similarly, upon cancellation of an order, the flight planner 120 may access order and flight data 124 to determine whether another order of the same items is open for delivery, such that the UAV 102 may be diverted to the delivery area of the new order. Additionally, the flight planner 120 may assess landing capacity at multiple distribution centers within range to determine where the UAV 102 should land. Where the order update includes addition of items to an order, the flight planner 120 may make a similar assessment to determine which distribution centers have the additional item in stock, are in range of the UAV 102, and have the landing and launch capacity to fulfill the order quickly. Where the order update is a delay of the order, the UAV 102 may determine whether to engage in a holding pattern or to return to a distribution center and re-launch to fulfill the order.

Once the flight planner 120 has identified a destination, the flight planner 120 may determine a route to traverse to reach the selected destination. The route may be chosen based on various efficiency criteria. For example, the flight planner 120 may use a skymap and execute an algorithm to determine traversal costs for various routes from the location of the UAV 102 to the destination. Traversal costs may include, for example, fuel and/or power expenditure, time of traversal, distance of traversal, and the like. The skymap may include various information, such as flight corridors and/or air traffic that may restrict available routes. The flight planner 120 may then update the flight plan to traverse the lowest cost route to the new destination. For example, in some embodiments, the flight planner 120 may first remove from consideration any routes to the destination which are impracticable or unfeasible based on high priority factors. The flight planner 120 may then calculate traversal costs for the remaining routes to choose an updated route. Where no remaining routes are available, the flight planner 120 may take a predetermined backup action, such as returning to a closest landing location, the delivery may then be completed by the UAV 102 as conditions change, be delivered by another UAV, or cancelled, depending on factors such as weather, air traffic restrictions, and the like.

An executing operation 208 executes the updated flight plan. To execute the updated flight plan, the flight planner 120 transmits the updated flight plan to the flight controller 122. Where the flight planner 120 is located at the UAV 102, the flight planner 120 may directly transmit the flight plan to the flight controller 122. Where the flight planner 120 is remote from the UAV 102, the flight planner 120 may transmit the updated flight plan to the UAV 102 via the communications system 116 of the UAV 102, where the flight plan is then transmitted to the flight controller 122. To execute the updated flight plan, the flight controller 122 communicates with various components of the UAV 102, such as the actuator control 126, propulsion control 128, and payload management 130 to adjust propulsion and control surfaces of the UAV 102 to navigate to the destination. In some implementations, the flight planner 120 may transmit information about the updated flight plan to additional locations. For example, the flight planner 120 may communicate with the operating device 110 to provide updates regarding the status of the updated order, such as an estimated time of delivery.

Figure 5:
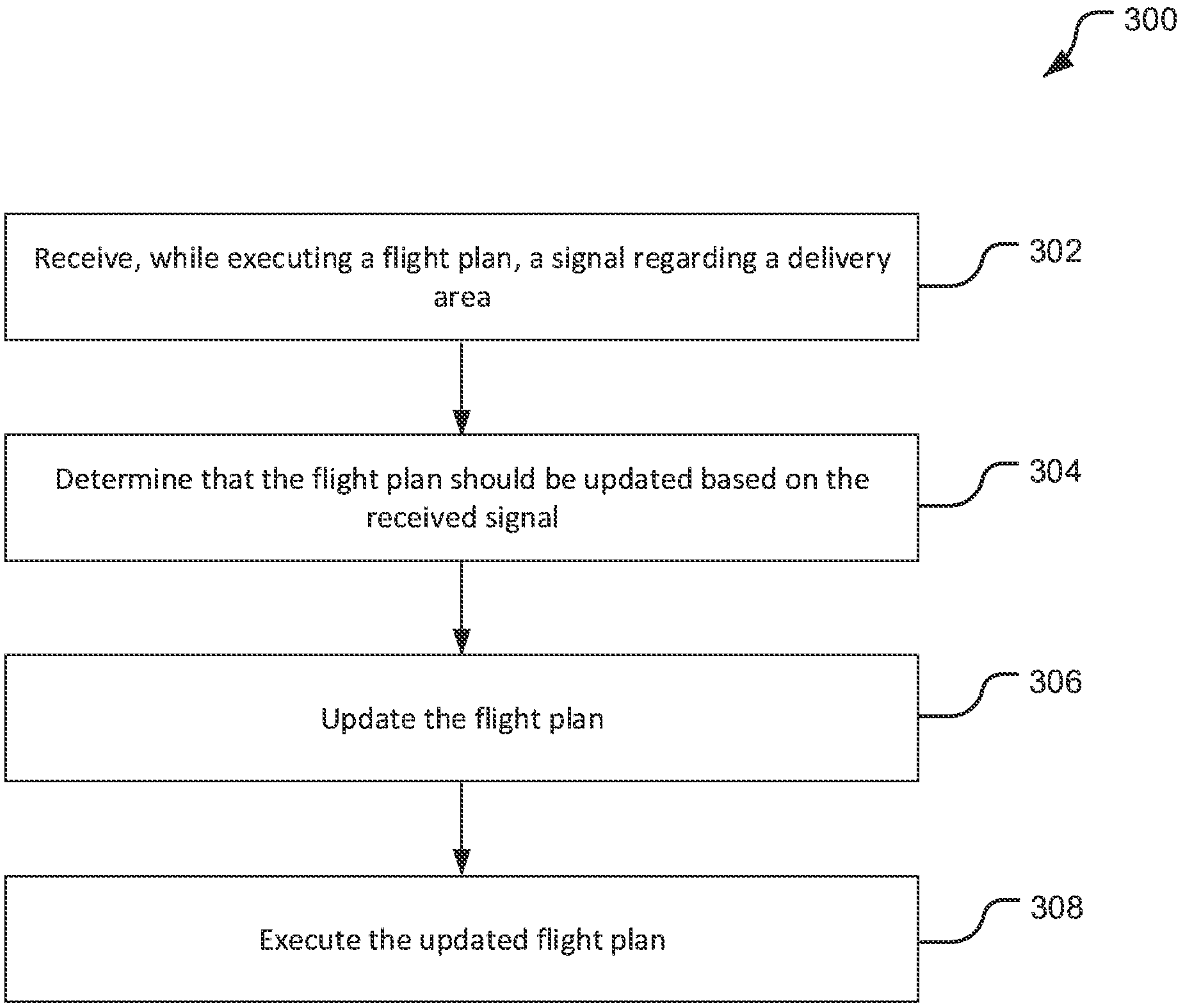
FIG. 5 is a flow diagram of example operations for updating a flight plan for a UAV responsive to communications regarding a delivery area.

FIG. 5 is a flow diagram of a method 300 for updating a flight plan for a UAV responsive to communications regarding a delivery area. Operations of the method 300 may be performed, in some examples, by various components of the control system 114 of the UAV 102. A receiving operation 302 receives a signal regarding a delivery area while executing a flight plan. The signal may be received initially by the communications system 116 and may be transmitted to the flight planner 120 where the flight planner 120 is located aboard the UAV 102. The receiving operation 302 may generally include receipt of the signal by the flight planner 120, which may be located at the UAV 102 or remote from the UAV 102. The signal regarding the delivery area may be received from, for example, the operating device 110, the delivery module 108, or another source, such as an emergency or weather alert. The signal may also be received from other components of the UAV 102, such as an aircraft detection and avoidance system aboard the UAV 102. For example, a signal from the operating device 110 may be an update to the initial delivery area and a signal from the delivery module 108 may be a signal indicating that the original delivery area is obstructed and currently unavailable for delivery. Emergency or weather alerts may include alerts or commands sent to all aircraft or all UAVs in a particular fleet to avoid a particular airspace. The signal may also be received, in some embodiments, by one or more sensors of the sensor system 118.

A determining operation 304 determines that the flight plan should be updated based on the received signal. In some embodiments, the flight planner 120 may carry out the operation 304. As discussed above with respect to the decision 204, a change regarding delivery area generally does update the flight plan in some aspect. Accordingly, in some implementations, a signal regarding the delivery area automatically triggers the flight planner 120 to update the flight plan. In some implementations, some signals regarding the delivery area, such as a signal from the delivery module 108 that the delivery area is clear, may not trigger an update to the flight plan.

An updating operation 306 updates the flight plan. The updating operation 306 may take into account similar factors described above with respect to the updating operation 206 and may be carried out by the flight planner 120. Additionally, the updating operation 306 may consider alternate delivery areas or other factors to update the flight plan. For example, where the delivery area signal is a signal from a delivery module 108 indicating that the delivery area is obstructed, the flight planner 120 may determine whether any other nearby delivery areas are available. The flight planner 120 may consider pre-defined delivery areas and may also access data regarding topography, tree cover, buildings, and other features that may obstruct delivery. The flight planner 120 may also determine to execute a holding pattern while waiting for the obstruction to be cleared from the delivery area. An updated flight plan including a holding pattern may include instructions to periodically communicate with the delivery module 108 to check the status of the delivery area.

In some situations, a requested change to a delivery area may be outside of range of the UAV 102. For example, the UAV 102 may be unable to cover the distance to the updated delivery area without being refueled or recharged. In these instances, the flight planner 120 may identify charging locations (e.g., distribution centers) available to charge the UAV 102 or with landing capacity to land the UAV 102 and continue the order on a different UAV that is fully charged or fueled. Once an updated destination is identified, the flight planner 120 may choose a path to the updated destination using similar methods as those described above with respect to updating operation 206.

An executing operation 308 executes the updated flight plan. When the updated flight plan is created, the flight planner 120 may transmit the updated flight plan to the flight controller 122, which may then execute the updated flight plan by communicating with other UAV control systems 114. The flight planner 120 may also transmit information regarding the updated flight plan to the operating device 110 or to other systems within the distribution network (e.g., distribution center or control center systems).

Figure 6:
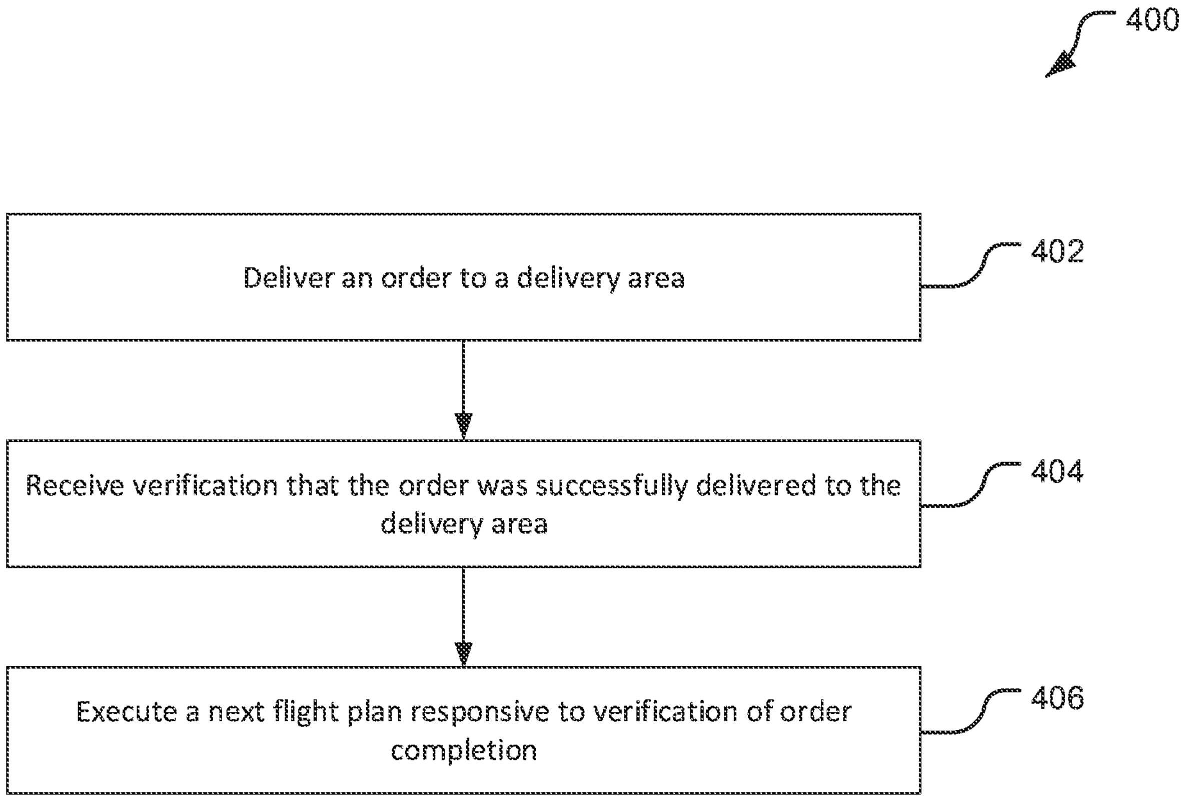
FIG. 6 is a flow diagram of example operations for verifying delivery of an order using the system described herein.

FIG. 6 is a flow diagram of a method 400 for verifying delivery of an order using the system described herein. The operations of the method 400 may be carried out, in various embodiments, by control systems 114 of the UAV 102 and/or the UAV 102. A delivering operation 402 delivers an order to a delivery area. In various implementations, the delivering operation 402 may include releasing a payload including items of the order at the delivery area associated with the order. For example, the flight controller 122 may communicate with payload management 130 when the UAV 102 is within the delivery area and payload management 130 may release the payload. In some implementations, the payload may be connected to a parachute to ensure that the payload lands undamaged. Further, the payload may include machine readable indicia (e.g., a barcode, QR code, or RFID tag) associating the payload with the order. As another example, the delivering operation 402 may include landing of the UAV 102 in a delivery area and unloading or otherwise off-boarding of the payload. In these instances, the user may physically retrieve the payload from the UAV 102, the UAV 102 may include an expelling feature (e.g., drop door with slide or the like) that opens in the landing area to off-board the package, or the like.

A receiving operation 404 receives verification that the order was delivered to the delivery area. In some implementations, verification of the order delivery is transmitted by the delivery module 108 or the operating device 110 to the flight planner 120, flight controller 122, or other control systems (e.g., computing systems at a flight control location). Verification may include either or both of verification that the payload was positioned in the delivery area and verification that a specific customer physically retrieved the payload. For example, the delivery module 108 may use various sensors to detect that payload is present in the delivery area at a time when the payload was dropped by the UAV 102. The delivery module 108 may also use visual (camera) verification or may, for example, read an RFID tag located on the payload to verify that the order is within the delivery area. In some implementations, an order recipient may scan machine readable indicia at the delivery module 108 to verify delivery. The delivery module 108 may also, in some implementations, include various interfaces to verify delivery of the order to a particular recipient. For example, the delivery module may include a camera and use facial recognition, identification scanning, or other methods to identify the recipient of the order.

Order verification may also be collected and transmitted by the operating device 110. For example, a recipient may be asked to scan machine readable indicia on the payload or manually acknowledge delivery of the order. In some implementations, the sensor system 118 of the UAV 102 may also verify order delivery thorough, for example, an image of the delivery area after the order is delivered.

An executing operation 406 executes a next flight plan responsive to completion of the order. The executing operation 406 may be triggered directly by receipt of delivery verification, such that in the case of a technical difficulty (e.g., the payload management 130 does not release the payload) the UAV 102 does not continue on with the next task without making another attempt at delivering the order.

During the executing operation 406, the flight planner 120 may determine a next flight plan based on the location of the UAV 102. For example, the flight planner 120 may communicate with propulsion control 128 to determine a propulsion status of the UAV 102. Where the UAV 102 is below a certain threshold (e.g., less than a threshold amount of fuel or charge remaining), the flight planner 120 may determine a closest location with capacity to charge or refuel the UAV 102 and generate a flight plan to that location. Where the propulsion status shows that the UAV 102 is above a threshold to fulfill another order, the flight planner 120 may communicate with distribution centers and access order and flight data 124 to identify an order that may be filled by the UAV 102 and to generate a flight plan to navigate the UAV 102 to a distribution center that may provide items to fill the order. Once the flight planner 120 has generated a next flight plan, the flight planner 120 may transmit the next flight plan to the flight controller 122 for execution.

Figure 7:
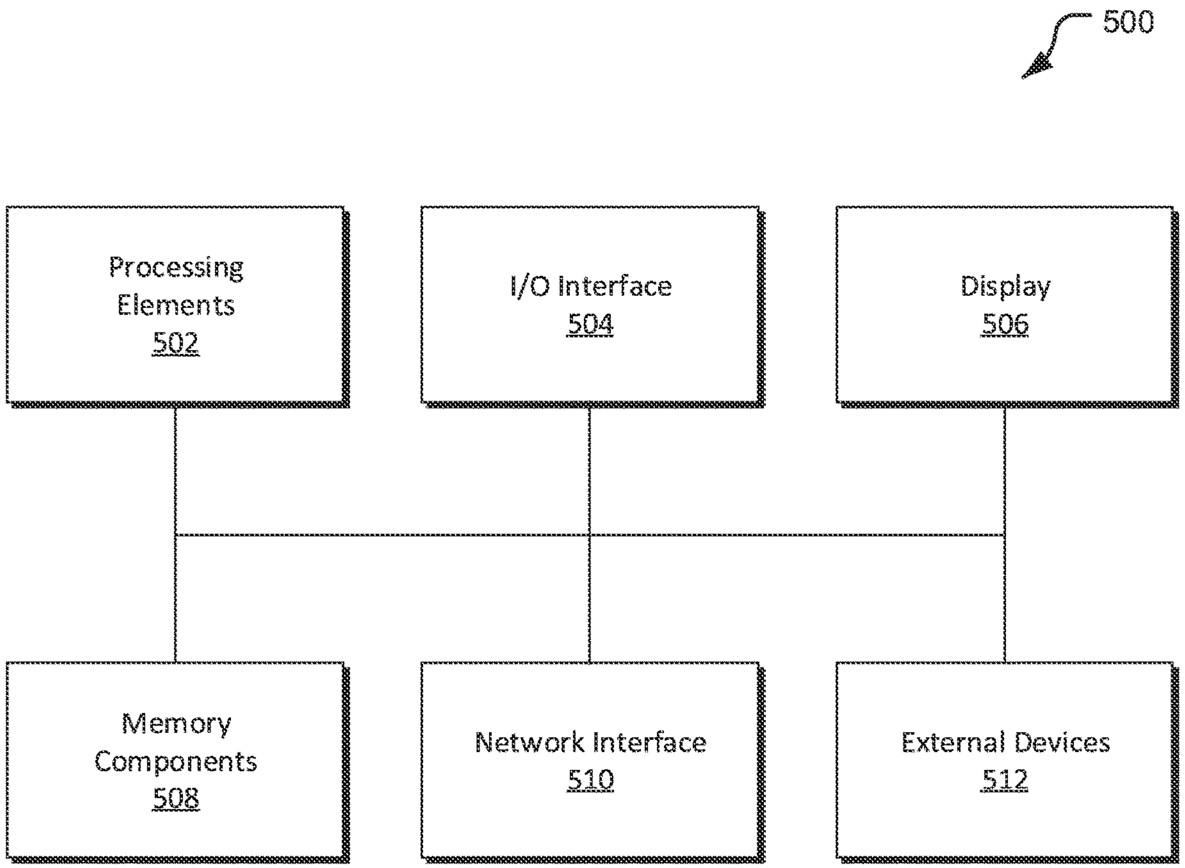
FIG. 7 is a schematic diagram of an example computer system implementing various embodiments in the examples described herein.

FIG. 7 is a schematic diagram of an example computer system 500 for implementing various embodiments in the examples described herein. A computer system 500 may be used to implement the operating device 110 (in FIG. 1) or integrated into one or more components of the UAV control systems 114. For example, the flight planner 120 may include one or more of the components of the computer system 500 shown in FIG. 7. The computer system 500 may be used to implement or execute one or more of the components or operations disclosed in FIGS. 1-6. In FIG. 7, the computer system 500 may include one or more processing elements 502, an input/output interface 504, a display 506, one or more memory components 508, a network interface 510, and one or more external devices 512. Each of the various components may be in communication with one another through one or more buses, communication networks, such as wired or wireless networks.

The processing element 502 may be any type of electronic device capable of processing, receiving, and/or transmitting instructions. For example, the processing element 502 may be a central processing unit, microprocessor, processor, or microcontroller. Additionally, it should be noted that some components of the computer 500 may be controlled by a first processor and other components may be controlled by a second processor, where the first and second processors may or may not be in communication with each other.

The memory components 508 are used by the computer 500 to store instructions for the processing element 502, as well as store data, such as order and flight data 124 (FIG. 2) and the like. The memory components 508 may be, for example, magneto-optical storage, read-only memory, random access memory, erasable programmable memory, flash memory, or a combination of one or more types of memory components.

The display 506 provides visual feedback to a user, such as a display of the operating device 110 (FIG. 1). Optionally, the display 506 may act as an input element to enable a user to control, manipulate, and calibrate various components of the operating device 110 or the flight planner 120 as described in the present disclosure. The display 506 may be a liquid crystal display, plasma display, organic light-emitting diode display, and/or other suitable display. In embodiments where the display 506 is used as an input, the display may include one or more touch or input sensors, such as capacitive touch sensors, a resistive grid, or the like.

The I/O interface 504 allows a user to enter data into the computer 500, as well as provides an input/output for the computer 500 to communicate with other devices or services (e.g., UAV 102, distribution centers, delivery module 108 and/or other components in FIG. 1). The I/O interface 504 can include one or more input buttons, touch pads, and so on.

The network interface 510 provides communication to and from the computer 500 to other devices. For example, the network interface 510 allows the operating device 110 to communicate with the flight planner 120 through a communication network. The network interface 510 includes one or more communication protocols, such as, but not limited to WiFi, Ethernet, Bluetooth, and so on. The network interface 510 may also include one or more hardwired components, such as a Universal Serial Bus (USB) cable, or the like. The configuration of the network interface 510 depends on the types of communication desired and may be modified to communicate via WiFi, Bluetooth, and so on.

The external devices 512 are one or more devices that can be used to provide various inputs to the computing device 500, e.g., mouse, microphone, keyboard, trackpad, or the like. The external devices 512 may be local or remote and may vary as desired. In some examples, the external devices 512 may also include one or more additional sensors.

The foregoing description has a broad application. For example, while examples disclosed herein may focus on central communication system, it should be appreciated that the concepts disclosed herein may equally apply to other systems, such as a distributed, central or decentralized system, or a cloud system. For example, the flight planner 120 and/or other components in the distribution system (e.g., distribution center inventory and computing systems) may reside on a server in a client/server system, on a user mobile device, or on any device on the network and operate in a decentralized manner.

The technology described herein may be implemented as logical operations and/or modules in one or more systems. The logical operations may be implemented as a sequence of processor-implemented steps directed by software programs executing in one or more computer systems and as interconnected machine or circuit modules within one or more computer systems, or as a combination of both. Likewise, the descriptions of various component modules may be provided in terms of operations executed or effected by the modules. The resulting implementation is a matter of choice, dependent on the performance requirements of the underlying system implementing the described technology. Accordingly, the logical operations making up the embodiments of the technology described herein are referred to variously as operations, steps, objects, or modules. Furthermore, it should be understood that logical operations may be performed in any order, unless explicitly claimed otherwise or a specific order is inherently necessitated by the claim language.

In some implementations, articles of manufacture are provided as computer program products that cause the instantiation of operations on a computer system to implement the procedural operations. One implementation of a computer program product provides a non-transitory computer program storage medium readable by a computer system and encoding a computer program. It should further be understood that the described technology may be employed in special purpose devices independent of a personal computer.

The above specification, examples and data provide a complete description of the structure and use of exemplary embodiments of the invention as defined in the claims. Although various embodiments of the claimed invention have been described above with a certain degree of particularity, or with reference to one or more individual embodiments, it is appreciated that numerous alterations to the disclosed embodiments without departing from the spirit or scope of the claimed invention may be possible. Other embodiments are therefore contemplated. It is intended that all matter contained in the above description and shown in the accompanying drawings shall be interpreted as illustrative only of particular embodiments and not limiting. Changes in detail or structure may be made without departing from the basic elements of the invention as defined in the following claims.

The invention claimed is:

1. A method comprising:

executing, by an unmanned aerial vehicle (UAV), an initial flight plan based on an order placed by a user, wherein the order comprises a request for one or more items to be delivered to a delivery location by the UAV;

receiving, during execution of the initial flight plan, an order update from the user including a change to the order as the one or more items of the order are being delivered by the UAV by execution of the initial flight plan;

classifying the order update as one or more of a set of classifications consisting of an update of a timing of the order, an update of a content of the order, and an update of a delivery location of the order;

determining a limiting factor associated with the order update, wherein the limiting factor defines a factor material to the feasibility of execution of the order update by the UAV;

determining that the initial flight plan should be updated based on the order update, the classification of the order update, and the limiting factor;

updating the initial flight plan based on the order update and state information corresponding to the UAV, wherein updating the initial flight plan comprises one or more of updating a delivery area or returning to an origin to add an item to the order, before delivery to an original delivery area; and transmitting, during the execution of the initial flight plan by the UAV, the updated flight plan to a flight controller of the UAV for execution of the updated flight plan.

2. The method of claim 1, further comprising:

verifying that the order was fulfilled in accordance with the order update based on receipt of an order verification from a delivery module sensing delivery of a payload containing items of the order, wherein the delivery module is located at the delivery area and includes one or more sensors configured to monitor the delivery area.

3. The method of claim 1, wherein updating the delivery area comprises changing a delivery area responsive to the order update identifying an updated delivery area and determining a flight path to the updated delivery area.

4. The method of claim 1, wherein:

the limiting factor comprises a propulsion status of the UAV and a payload status of the order; and determining that the initial flight plan should be updated based on the updated order comprises evaluating the propulsion status and the payload status.

5. The method of claim 4, wherein the payload status includes a delivery time condition for one or more time-sensitive items included in the order being delivered.

6. The method of claim 1, wherein state information of the UAV comprises one or more of a location of the UAV, a propulsion status of the UAV, and a payload status of the UAV.

7. The method of claim 1, wherein the order is a first order, wherein the order update comprises cancelling a first item of the one or more items of the order and wherein updating the delivery area comprises determining a second order comprising a request for a delivery of the first item and determining a flight path to a delivery location of the second order during the execution of the initial flight plan.

8. The method of claim 1, wherein the order update comprises one or more of a request for an addition of an item to the order or a request for a removal of an item from the order.

9. The method of claim 1, wherein the order update from the user comprises a request input by the user via a user device to change the delivery location.

10. The method of claim 1, wherein updating the initial flight plan comprises updating the initial flight plan via a flight planner comprising a computing system remote from and in communication with the UAV.

11. An unmanned aerial vehicle (UAV) comprising:

a flight controller configured to communicate with control systems of the UAV to execute a flight plan to deliver one or more items of an order from an origin to a delivery area;

a communications system configured to communicate with a user device during the execution of the flight plan to receive an order update including a change to the order; and a flight planner configured to:

classify the order update as one or more of a set of classifications consisting of an update of a timing of the order, an update of a content of the order, and an update of a delivery location of the order;

determine a limiting factor associated with the order update, wherein the limiting factor defines a factor material to the feasibility of execution of the order update by the UAV; and update the flight plan for the UAV based on the order update, the classification of the order update, and the limiting factor, wherein the updating the flight plan comprises one or more of changing the delivery area to an updated delivery area responsive to the order update identifying the updated delivery area, or returning to an origin to add an item to the order, before delivery to an original delivery area.

12. The UAV of claim 11, wherein the communications system is further configured to communicate a verification of delivery to the user device responsive to delivery of the one or more items of the order to the delivery area.

13. The UAV of claim 11, wherein the flight planner is configured to update the flight plan based on state information corresponding to the UAV.

14. The UAV of claim 13, wherein the state information corresponding to the UAV comprises one or more of a location of the UAV, a propulsion status of the UAV, and a payload status of the UAV.

15. A method comprising:

executing, by an unmanned aerial vehicle (UAV), an initial flight plan based on an order placed by a user, wherein the order comprises a request for one or more items to be delivered to a delivery location by the UAV;

presenting, by a user device associated with the user, an option to update a timing of the order, an option to update a content of the order, and an option to update the delivery location of the order;

receiving, during execution of the initial flight plan, an order update from the user device comprising an update to the timing of the order, an update to the content of the order, or an update to the delivery location of the order;

determining a limiting factor associated with the order update, wherein the limiting factor defines a factor material to the feasibility of execution of the order update by the UAV;

updating the initial flight plan based on the order update, the limiting factor, and state information corresponding to the UAV; and transmitting, during the execution of the initial flight plan by the UAV, the updated flight plan to a flight controller of the UAV for execution of the updated flight plan.

16. The method of claim 15, wherein the limiting factor comprises at least one of a temperature limitation associated with the order update, a time limitation associated with the order update, a flight range capacity of the UAV, a volume capacity of the UAV, or a weight capacity of the UAV.

17. The method of claim 16, wherein:

the order update comprises an update to the content of the order defining an additional item to add to the content of the order; and updating the initial flight plan comprises:

determining that adding the additional item to the content of the order does not cause the content of the order to exceed the volume capacity of the UAV; and determining that adding the additional item to the content of the order does not cause the content of the order to exceed the weight capacity of the UAV.

18. The method of claim 15, wherein:

determining the limiting factor comprises weighting one or more limiting factors based on a priority of each of the one or more limiting factors, wherein the priority is based on a contribution of each of the one or more limiting factors to the feasibility of the order update; and updating the initial flight plan further comprises updating the initial flight plan based on the weight of the one or more limiting factors.

19. The method of claim 15, wherein:

the delivery location is a first location, wherein the first location is a location of the user device;

the order update comprises an update to the delivery location of the order; and updating the initial flight plan comprises:

determining a movement of the user device from the first location to a second location; and updating the delivery location to the second location.

20. The method of claim 15, wherein updating the initial flight plan comprises:

determining that the order update is not feasible for the UAV based on the limiting factor; and transmitting a request for an additional UAV to execute the order update.

* * * * *